Figure 1:
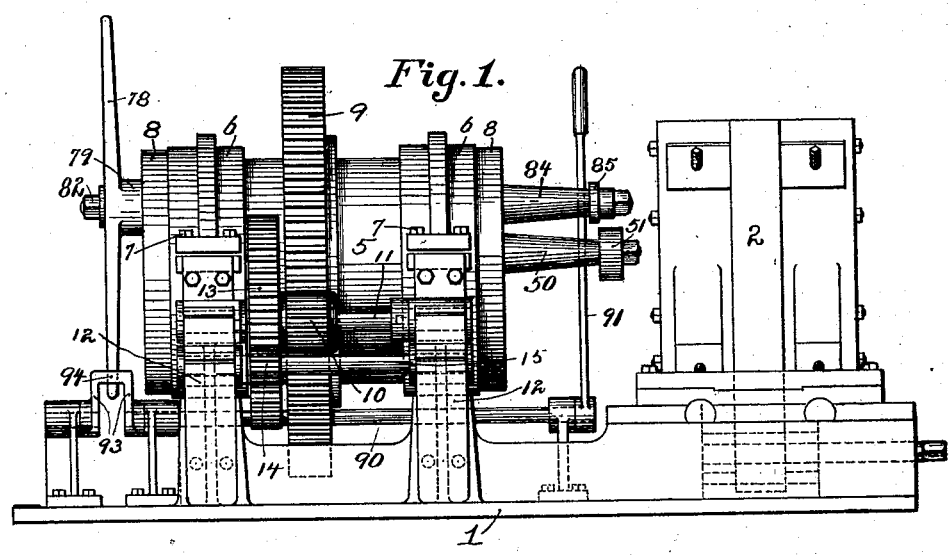

No. 694,524. Patented Mar. 4, 1902.
H. E. BOYD.
ROTARY PIPE CUTTING MACHINE.
(Application filed Mar. 22, 1901.)

(No Model.) 4 Sheets—Sheet 1.

Witnesses:
Walter Lamarjee
Fred D. Sweet

Inventor:
Henry E. Boyd
By Kay & Totten
Attorneys

No. 694,524. Patented Mar. 4, 1902.
H. E. BOYD.
ROTARY PIPE CUTTING MACHINE.
(Application filed Mar. 22, 1901.)
(No Model.) 4 Sheets—Sheet 2.

Witnesses:

Inventor:
Henry E. Boyd
By Kay & Totten
Attorneys

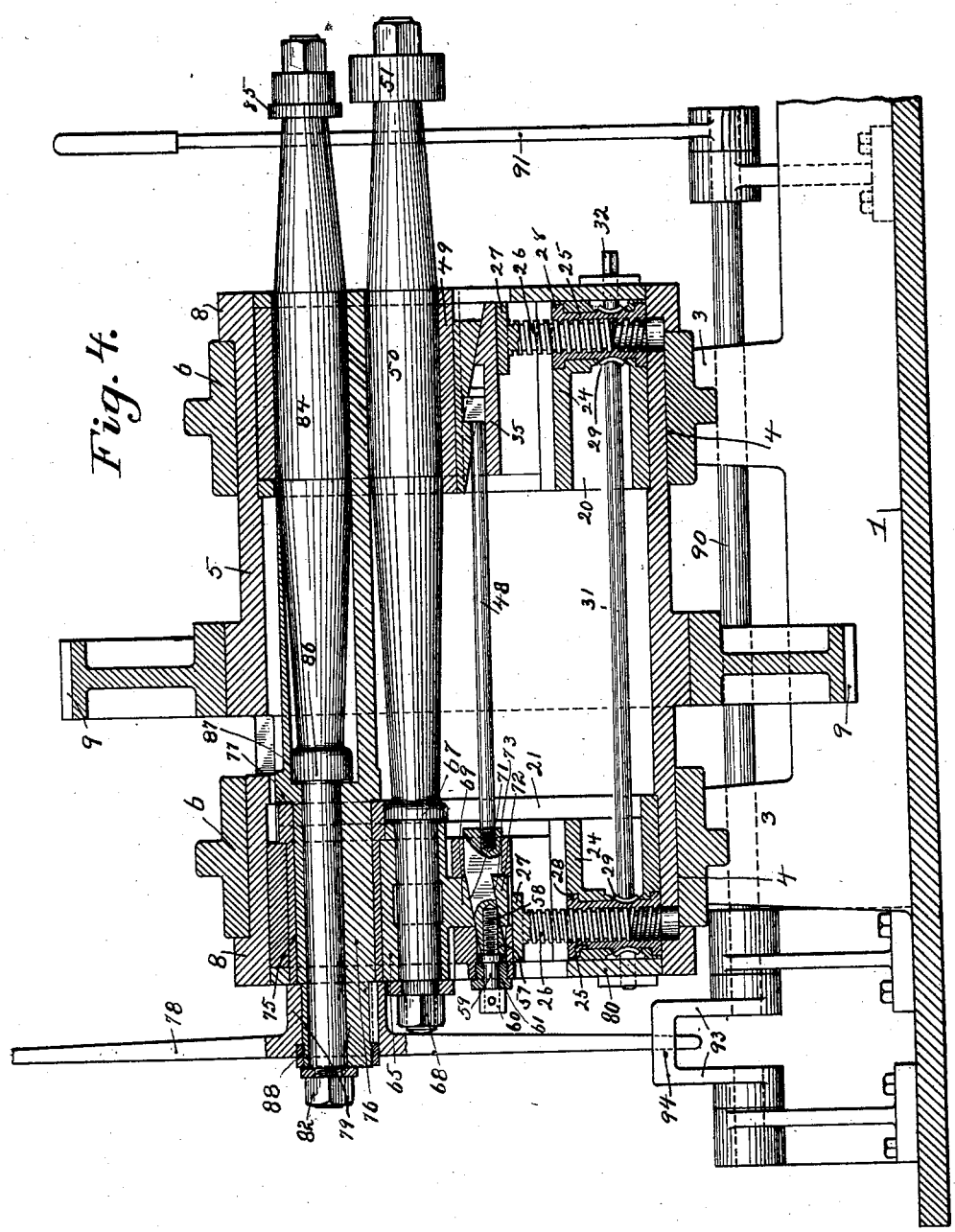

No. 694,524. Patented Mar. 4, 1902.
H. E. BOYD.
ROTARY PIPE CUTTING MACHINE.
(Application filed Mar. 22, 1901.)
(No Model.) 4 Sheets—Sheet 4.

Witnesses:

Inventor:

UNITED STATES PATENT OFFICE.

HENRY E. BOYD, OF McKEESPORT, PENNSYLVANIA, ASSIGNOR TO NATIONAL TUBE COMPANY, OF NEW YORK, N. Y., A CORPORATION OF NEW JERSEY.

ROTARY PIPE-CUTTING MACHINE.

SPECIFICATION forming part of Letters Patent No. 694,524, dated March 4, 1902.

Application filed March 22, 1901. Serial No. 52,319. (No model.)

*To all whom it may concern:*

Be it known that I, HENRY E. BOYD, a resident of McKeesport, in the county of Allegheny and State of Pennsylvania, have invented a new and useful Improvement in Rotary Pipe-Cutting Machines; and I do hereby declare the following to be a full, clear, and exact description thereof.

My invention relates to machines for cutting off the crop ends of comparatively large sized wrought-metal pipes, and more especially to a machine of the rotary type.

In the manufacture of large-sized wrought-metal pipes, such as gas and water mains, a plate of suitable width and thickness has its edges scarfed and is then bent into tubular form with the scarfed edges overlapping. This bent-up plate or "skelp," as it is called, is then raised to a suitable welding heat and passed over a ball between welding-rolls, whereby the overlapping scarfed edges are welded together. This operation leaves the ends of the pipe more or less ragged, and generally the welded seam is not perfect at the extreme ends. These imperfect and irregular ends must be removed. Heretofore these ends have been removed by mounting the pipe in specially-constructed lathes and cutting the end off by a turning-tool mounted in the manner of lathe-tools and operating in the same manner. This operation of course, while effective for the purpose, is exceedingly slow and expensive. Various forms of shearing-machines have been devised for the purpose, but with only a fair degree of efficiency.

The object of my invention is to provide a rotary shearing-machine for cutting off the crop ends of wrought-metal pipes which is not open to the objections above stated, which is simple and compact and very efficient in its operation, and which can be readily adjusted to operate on pipes of various diameters within certain limits and to pipes having walls of various thicknesses, and which will not mutilate the ends of the pipe, but will leave the same perfectly circular and of the same diameter as the body of the pipe and will form a square end edge thereupon.

To these ends my invention comprises, generally stated, a rotating barrel in which are mounted two shafts, each of which carries one of the shearing-disks, said shafts being so mounted that they can be readily adjusted toward and from the axis of the barrel to accommodate pipes of various sizes and so that the distance between said shafts can be varied to accommodate pipes having various thicknesses of walls, means being provided for moving one of said shafts toward and from the other in order to permit the insertion of the pipe end between the shearing-disks and cutting the same off thereby.

My invention also comprises an eccentric sleeve or bearing in which the movable shaft is mounted, by the rotation of which sleeve or bearing the said shaft is moved toward and from the other shaft, and means within the control of the operator for so rotating this eccentric sleeve or bearing without stopping the machine.

My invention further comprises details of construction which will be hereinafter more fully described and claimed.

Figure 2:
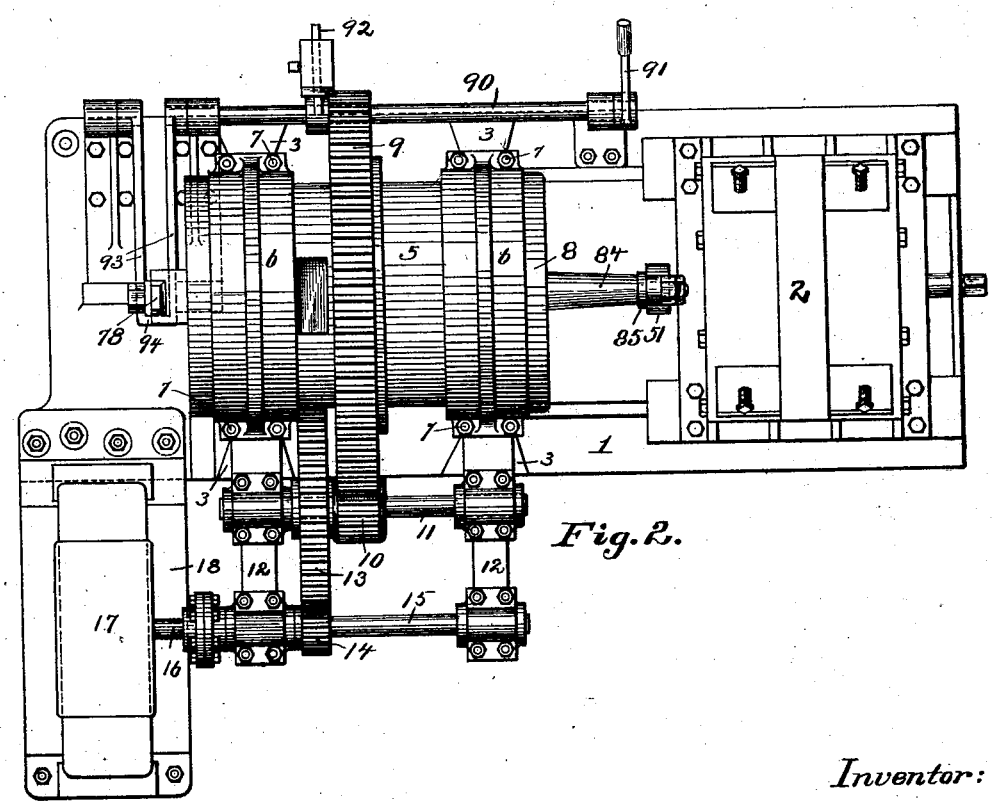
Figure 3:
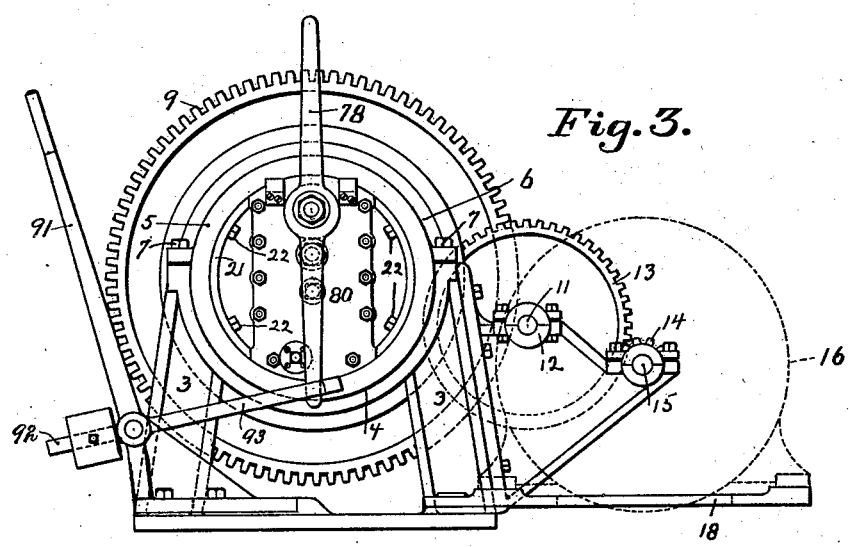
Figure 5:
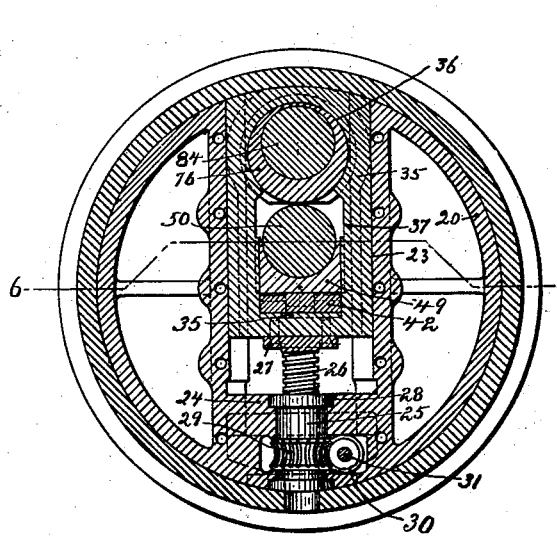
Figure 6:
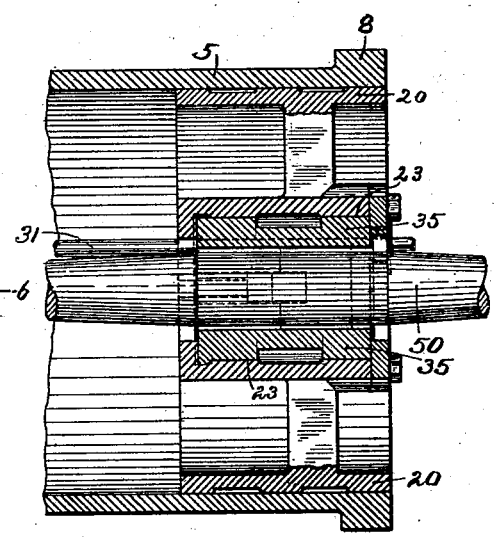
Figure 7:
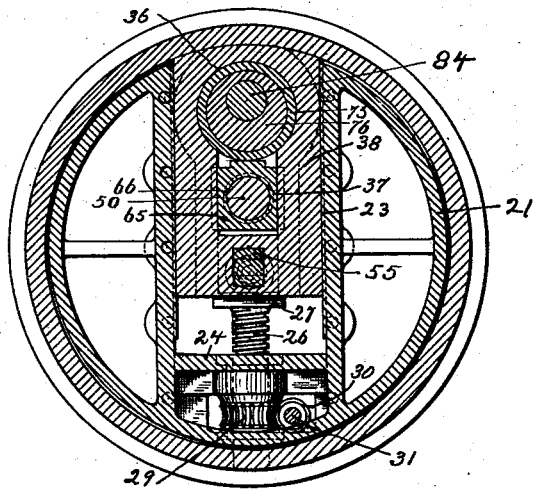
Figure 8:
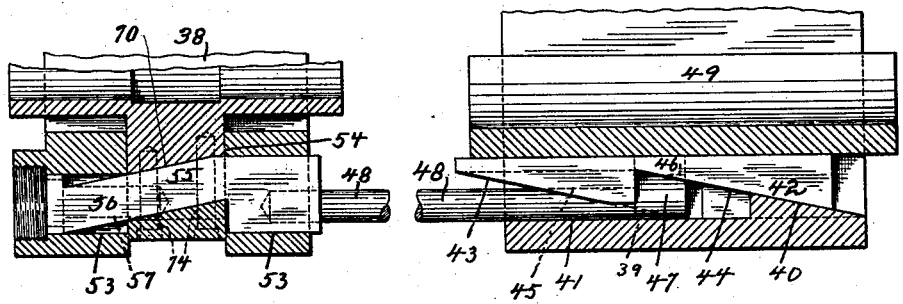

In the accompanying drawings, Figure 1 is a side elevation of my improved machine. Fig. 2 is a plan view thereof. Fig. 3 is a rear end elevation of the same. Fig. 4 is a vertical longitudinal section through the same, the clamp for the pipe being omitted. Fig. 5 is a vertical transverse section through the front head in the barrel. Fig. 6 is a horizontal section through said front head. Fig. 7 is a transverse vertical section through the rear head of the barrel. Fig. 8 is a detail view, on an enlarged scale, of the means for adjusting the relative positions of the cutter-spindles.

1 represents a bed-plate upon which all of the operative parts of the machine are mounted. On the forward end of this bed-plate I provide the vise or clamp 2, which is provided with suitable movable jaws for gripping the pipe whose end is to be sheared off. Inasmuch as this vise or clamp may be of any approved type and is not claimed herein, further description thereof is deemed unnecessary. Suffice it to say that the vise is so constructed as to hold the pipe with its axis coincident with the axis of the rotating barrel of the machine, as will hereinafter more fully appear.

Formed integrally with the base-plate 1 or suitably secured thereto are the standards or frames 3, which are provided with semicircular bearing-faces 4 for receiving the rotating barrel 5. Semicircular cap-frames 6 pass over the barrel and are secured to the frames or standards 3, as by means of the bolts 7. The barrel 5 is provided with the flanges 8 8, which bear against the frames 4 and caps 6, thereby preventing endwise displacement of said barrel. The barrel is provided midway of its length with the peripheral spur-gear 9, which meshes with a spur-pinion 10 on the lower counter-shaft 11, which counter-shaft is mounted in the brackets or frames 12, bolted or otherwise suitably secured to the sides of the bed-plate 1. The counter-shaft 11 is also provided with a spur-gear 13, which meshes with the spur-pinion 14 on the main drive-shaft 15, said shaft being mounted in bearings in the outer ends of the frames or brackets 12 and being coupled to the armature-shaft 16 of the electric motor 17, which is mounted on an extension-plate 18, bolted or otherwise suitably secured to the bed-plate 1. By the gearing described the rotation of the armature of the motor 17 is communicated to the barrel 5, and in the operation of the machine this barrel rotates constantly, as will hereinafter be more fully explained.

The barrel 5 is provided with the front head 20 and the rear head 21, said heads being suitably secured in said barrel, as by means of the tap-screws 22. Each of these heads is provided with the diametrically-arranged guides or ways 23, in which move the bearing-frames hereinafter more fully described. At one end of the guides or ways 23 the heads are provided with the webs 24, which are provided with suitable bearings for the bushings 25, said bushings being internally screw-threaded for receiving the screws 26, provided with heads 27, which bear against the bearing-frames in the heads. The bushings 25 have their lower ends stepped in the peripheral ring of the heads 21 and 22, respectively, and are provided with flanges 28 above the webs 24 and below said webs with worm-wheels 29, which mesh with worms 30 on the shaft 31, which is journaled in suitable bearings in said heads and which is provided at its forward end with the squared portion 32 for receiving a wrench or other implement by means of which said shaft may be rotated and through the worms 30 and worm-gears 29 rotate the bushings 25. These bushings are so constructed and mounted, as shown, that they cannot move endwise, and consequently the rotation thereof will cause the screws 26 to move toward or from the axis of the barrel 5, according to the direction of the rotation of the shaft 31, thereby causing a similar movement of the bearing-frames in the guides or ways 23 of the heads.

The bearing-frame 35 in the front head is provided with an opening having the circular upper portion 36 and the straight lower portion 37, and the bearing-frame 38 in the rear head is provided with an opening having a similar upper circular portion 36 and straight lower portion 37, which lower portion, however, is narrower than the corresponding portion in the front bearing-frame 35. The front bearing-frame is provided on its lower side wall with the inclined wedge surfaces 39 and 40, which wedge surfaces have the longitudinal slot 41 formed therein. On these wedge surfaces rests the double wedge 42, the same having the wedge surfaces 43 and 44 and being provided with the longitudinal slot 45, which is enlarged at its rear end, as shown at 46, to receive the head 47 on the rod 48. On the upper surface of the wedge 42 rests the brass box 49, which serves as a bearing for the shaft 50, on which is mounted the stationary shearing or anvil disk 51.

The rear bearing-frame 38 is provided at its lower end with the longitudinal opening 53 and with a vertical opening 54, which communicates with the opening 37 in said bearing. In the opening 53 is slidably mounted the block 55, which has a threaded aperture therein to receive the threaded end of the rod 48, before mentioned. The rear end of the block 55 is provided with the inclined arm 56, which is provided with a long screw-threaded hole 57 to receive the screw 58, said screw being provided with the shank 59 and enlarged head 60, which head is adapted to bear against the outer face of a bushing 61, screwed into the screw-threaded rear end of the opening 53. The head 60 of the screw 58 is provided with suitable openings or other means for receiving a spanner or other form of wrench whereby the screw may be rotated. In the straight portion 37 of the opening in the rear bearing-frame 38 is mounted the journal-bearing 65, the same being provided with an opening 66 for receiving the rear end of the shaft or spindle 50, the said shaft or spindle being provided with a shoulder 67, which bears against the front end of the bearing 65 and having a collar or nut 68 secured on the end thereof, which bears against the rear end of said bearing. This box or bearing is provided with the depending web 69, which is provided with the inclined face 71 and having secured to the lower end thereof the cap-piece 72, said cap-piece being provided with the inclined face 73 and being secured to the web 69 by means of screws 74. This construction therefore provides an opening 70 through the depending web portion 69 of the bearing 65, which opening has inclined walls and is adapted to receive the inclined arm 57 on the block 55, so that when the screw 58 is rotated it will move the block 55 longitudinally and through the inclined arm 56 in the inclined opening 70 will move the box 65 up and down, and through the rod 48 the movement of the block 55 will be communicated to the wedge 42 and cause a similar movement of the bearing-brass 49.

In the circular portion 36 of the opening in the rear bearing-frame 38 is fitted a suitable sleeve 75, which sleeve receives the rear end of the eccentric sleeve-bearing 76, the forward end of which sleeve-bearing fits in the circular portion 36 of the opening in the front bearing-frame 35. This sleeve-bearing is provided with the shoulder 77, which bears against the front end of the sleeve 75 and has suitably secured to the rear end thereof the cross-arms 78, the hub 79 of which arms bears against the rear face-plate 80, secured to the rear head 21, and by this means the said eccentric bearing-sleeve is held against endwise displacement. The cross-arms 78 are shown as secured to said sleeve by means of the nut 82. Mounted in this bearing-sleeve 76 is the spindle or shaft 84, to the forward end of which is secured the shearing-disk 85, said spindle being provided with the shoulder 86, which bears against a shoulder 87, formed on the interior of the eccentric bearing-sleeve 76 and having its rear end provided with the collar or nut 88, which bears against the rear end of said eccentric bearing-sleeve, whereby longitudinal displacement of this spindle or shaft is prevented.

Suitably mounted on one side of the bed-plate 1 is the rock-shaft 90, which is provided at its forward end with the lever 91 in position to be manipulated by the operator and with the counterweighted arm 92, and at its rear end has connected thereto the arms 93, the outer ends of which are united by the cross-bar 94, which lies directly below the cross-arms 78 on the eccentric bearing-sleeve 76. It will be remembered that in the operation of the machine the barrel is rotated continuously, and inasmuch as the spindles 50 and 84 are at one side of the axis of said barrel it follows that the eccentric bearing-sleeve is being continuously carried around in a circle, thereby rotating the cross-arms. It is perfectly obvious that if said cross-arms are held against rotation during this rotation of the barrel it will cause a rotary movement to be imparted to the eccentric bearing-sleeve 76, which rotary movement will cause the spindle 84 to be moved away from or toward the spindle 51, as the case may be. This rotary movement of the eccentric bearing-sleeve 76, which is necessary in order to provide the necessary movement for opening and closing the shearing-disks 51 and 85, is secured at the desired time by the operator moving the lever 91 to raise the arms 93 and bring the cross-bar 94 in the path of the ends of the cross-arms 78, and when said cross-arms are carried by the rotating barrel into contact with said cross-bar 94 the said arms are held against further rotation, and inasmuch as the barrel continues to revolve the bearing-sleeve 76 will be given a rotary movement in its bearings in said barrel, which rotary movement of the eccentric bearing-sleeve will cause the shaft 84 to be moved away from or toward the shaft or spindle 50, as will be readily understood.

The operation of the machine is as follows: The bearing-frames in the front and rear heads will be adjusted by means of the screws 26, worm-gearing 29 30, and shaft 31 to bring the shafts 50 and 84 to the proper position for shearing the desired size of pipes, and the motor is then set in operation, thereby giving a continuous rotary movement to the barrel 5 and carrying these shafts, together with the shearing-disks, around in a circular path, said path corresponding to the walls of the pipe to be sheared. The eccentric sleeve-bearing 76 will be moved so that its thick portion is toward the spindle 50, which will cause the shearing disk 85 to recede from the shearing or anvil disk 51, thereby permitting the end of the pipe to be slipped over the anvil-disk 51 between the two disks, the pipe being then clamped in the vise 2. The operator then moves the lever 91 and raises the cross-bar 94, and the continued rotation of the barrel will carry the end of one of the cross-arms 78 against said cross-bar 94, which will stop the same, thereby causing a rotation of the eccentric bearing-sleeve 76, which causes the shearing-disk 85 to be moved against the outer periphery of the pipe, and this inward movement of the shearing-disk continues simultaneously with the rotation of the barrel, whereby said disk is pressed into and through the walls of the pipe and continuously around the same, thereby completely severing the end of the pipe, it requiring a little more than one revolution of the barrel to complete this severing of the pipe. The operator in the meantime has released the lever 90 to release the cross-arm 78 as soon as the eccentric sleeve-bearing 76 has been rotated to bring its thinnest portion opposite the spindle 50. As soon as the end of the pipe is severed, however, the operator again raises the cross-bar 94 and through the same stops the rotation of the cross-arms 78 and causes a further rotation of the eccentric sleeve-bearing 76, which will now bring the thickened portion of said bearing-sleeve opposite the spindle 50 and carry the spindle 84 outward, thereby opening the shearing-disks and permitting another pipe end to be put in place, when the operation is repeated.

In order to prevent the mutilation of the end of the pipe and the reduction of the diameter thereof, it is necessary that the anvil-disk 91 should press firmly against the interior surface of the pipe, and inasmuch as the eccentric bearing-sleeve 76 gives the same movement or throw to the movable shearing-disk 80, which movement or throw is sufficient to permit the insertion of the thickest walled pipes which it is desired to shear on the machine, it is necessary to get this firm adjustment of the anvil-disk 51 by means of the wedge 42 and inclined bearing-arm 56, which adjustment is secured by means of the screws 58, as before described. The adjustment by means of the screws 26 moves both shafts 50 and 84 outward or inward, as the case may be, to adapt the machine to the particular size of pipe to be sheared, while the wedge adjustment shown in Fig. 8 moves only the bearings for the spindle 50 in the front and rear bearing frames and does not move the spindle 84, so that by means of said wedge adjustments the relative distance between the two spindles and their shearing-disks may be varied to adapt them to tubes having various thicknesses of walls.

It will be observed that my machine is simple, compact, and easy of manipulation, and the arrangement is such as to adapt it to shear off the ends of various-sized pipes and pipes having different thicknesses of walls and does this shearing so as to produce an absolutely square end free from fins or other projections and without danger of mutilating the end of the pipe or reducing its diameter. The machine is adapted to shear a pipe of sufficient diameter to just barely slip over the anvil-disk 51 and will shear increasing sizes of pipes up to the full outward adjustment of the front and rear bearing-frames carrying the cutter-spindles.

What I claim as my invention, and desire to secure by Letters Patent, is—

1. In a pipe-cutting machine, the combination of a rotatable barrel, a stationary shaft therein carrying a cutter-disk adapted to bear on the inside of the pipe, a movable shaft also carrying a cutter-disk, and means for moving the latter in a parallel line toward and from the stationary shaft.

2. In a pipe-cutting machine, the combination of a rotatable barrel, a stationary shaft mounted therein and carrying a shearing-disk, a movable shaft carrying a shearing-disk, an eccentric bearing for said movable shaft, and means for rotating said eccentric bearing.

3. In a pipe-cutting machine, the combination of a rotatable barrel, a stationary shaft mounted therein and carrying a shearing-disk, a movable shaft also mounted therein and also carrying a shearing-disk, an eccentric bearing for said movable shaft, and means under the control of the operator for holding said eccentric bearing during the rotation of the barrel whereby said eccentric bearing is rotated to move the movable shaft toward and from the stationary shaft.

4. In a pipe-cutting machine, the combination of a rotatable barrel, a stationary shaft mounted therein and carrying a shearing-disk, a movable shaft also carrying a shearing-disk, an eccentric bearing in which said movable shaft is mounted, cross-arms on said eccentric bearing, and a movable stop adapted to be thrown in the path of said cross-arms whereby the eccentric bearing is rotated during the rotation of the barrel to move the movable shaft toward and from the stationary shaft.

5. In a pipe-cutting machine, the combination with a rotating barrel, of a stationary rotatable shaft carrying a shearing-disk adapted to bear on the inside of the pipe, a movable rotatable shaft also carrying a shearing-disk, and means for adjusting said shafts simultaneously toward and from the axis of the barrel.

6. In a pipe-cutting machine, the combination of a rotating barrel provided with heads having ways therein, of a stationary shaft carrying a shearing-disk, a movable shaft also carrying a shearing-disk, of bearing-frames in the guideways in the heads in which said shafts are mounted, and means for adjusting said bearing-frames toward and from the axis of the barrel.

7. In a pipe-cutting machine, the combination of a rotating barrel provided with heads having guideways, of bearing-frames moving in said guideways, a stationary shaft and a movable shaft mounted in said bearing-frames and each carrying a shearing-disk, of screws for adjusting said bearing-frames, a shaft and connected mechanism for simultaneously rotating said screws.

8. In a pipe-cutting machine, the combination of a rotating barrel provided with heads having ways therein, bearing-frames in said ways, a stationary shaft and a movable shaft each carrying a shearing-disk mounted in said frames, screws bearing against said frames, rotatable nuts engaging said screws, and mechanism for rotating said nuts in unison.

9. In a pipe-cutting machine, the combination of a rotating barrel, of a stationary shaft mounted therein, a movable shaft also mounted therein, means for moving said movable shaft toward and from the stationary shaft, and other means for adjusting said shafts relatively to each other.

10. In a pipe-cutting machine, the combination of a rotating barrel, of a stationary shaft mounted therein, a movable shaft also mounted therein, means for moving the latter toward and from the former, and wedges for adjusting the stationary shaft toward and from the movable shaft.

11. In a pipe-cutting machine, the combination of a rotating barrel, bearing-frames therein, a stationary shaft mounted in said bearing-frames, means for adjusting said stationary shaft in the bearing-frames, a movable shaft also mounted in said bearing-frames, and other means for moving the same toward and from the stationary shaft.

12. In a pipe-cutting machine, the combination of a rotating barrel, bearing-frames therein, a stationary shaft mounted in said bearing-frames, wedges for adjusting said stationary shaft in said frames, an eccentric bearing-sleeve also mounted in said frames, and a movable shaft mounted in said eccentric bearing-sleeve.

13. In a pipe-cutting machine, the combination of a rotating barrel, shafts carrying shearing-disks mounted in said barrel, means for adjusting said shafts toward and from the axis of the barrel, means for moving one of said shafts toward and from the other shaft, and other means for varying the distance between said shafts.

14. In a pipe-cutting machine, the combination of a rotating barrel, bearing-frames therein, shafts carrying shearing-disks mounted in said bearing-frames, means for adjusting the position of one of said shafts in said bearing-frames, means for moving said bearing-frames toward and from the axis of the barrel, and means for moving one of said shafts toward and from the other.

15. In a pipe-cutting machine, the combination of a rotating barrel, bearing-frames mounted therein, means for moving said bearing-frames toward and from the axis of the barrel, a shaft mounted in said bearing-frames, longitudinally-movable wedges for adjusting the position of said shaft in the bearing-frames, an eccentric bearing-sleeve also mounted in said bearing-frames, a shaft mounted in said eccentric bearing-sleeve, and means for rotating said eccentric bearing-sleeve.

16. In a pipe-cutting machine, the combination of a rotating barrel, bearing-frames therein, bearings for a stationary shaft in said frames, the front bearing having an inclined lower face, the rear bearing having an opening therethrough having inclined upper and lower walls, a wedge engaging the inclined face of the front bearing, and an inclined arm engaging the opening in the rear bearing, and means for moving said arm and wedge simultaneously.

In testimony whereof I, the said HENRY E. BOYD, have hereunto set my hand.

HENRY E. BOYD.

Witnesses:
ROBERT C. TOTTEN,
F. W. WINTER.